US011347874B2

(12) United States Patent
Starling et al.

(10) Patent No.: US 11,347,874 B2
(45) Date of Patent: May 31, 2022

(54) ENHANCING SECURITY IN A CONTENT MANAGEMENT SYSTEM

(71) Applicant: Charter Communications Operating, LLC, St. Louis, MO (US)

(72) Inventors: Jonathan M. Starling, Fond du Lac, WI (US); Ivan F. Wilson, IV, Fort Mill, SC (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 61 days.

(21) Appl. No.: 16/888,078

(22) Filed: May 29, 2020

(65) Prior Publication Data

US 2021/0374259 A1 Dec. 2, 2021

(51) Int. Cl.
*H04L 29/06* (2006.01)
*G06F 21/60* (2013.01)

(52) U.S. Cl.
CPC .................................. *G06F 21/604* (2013.01)

(58) Field of Classification Search
CPC ..... G06F 21/604; H04L 63/10; H04L 63/104; H04L 63/108; H04L 63/102; H04L 63/20
See application file for complete search history.

(56) References Cited

U.S. PATENT DOCUMENTS

2017/0068993 A1* 3/2017 Kim .................. G06Q 30/0277
2018/0218160 A1* 8/2018 Wetherall .............. G06F 16/219
2019/0205423 A1* 7/2019 Haven ............... G06F 16/24552
2019/0334917 A1* 10/2019 Demmler ............. H04L 63/104

OTHER PUBLICATIONS

Anonymous, Adobe Experience Manager, downloaded Jan. 25, 2020 from https://www.adobe.com/marketing/experience-manager.html?promoid= . . . , pp. 1-9.

(Continued)

*Primary Examiner* — Edward Zee
(74) *Attorney, Agent, or Firm* — Otterstedt, Wallace & Kammer, LLP

(57) ABSTRACT

A bridge component is interposed between a content targeting portion of a computerized content management system and a security portion of the system. the content targeting portion has a plurality of targeting segments defined therein. The bridge component creates a plurality of corresponding security groups for at least a subset of the plurality of targeting segments for which pre-existing security groups have not been created. For the targeting segments, accessing, with the bridge component, underlying logic used by the content targeting portion to create the targeting segments, and use the logic to determine whether each potential group member matches the logic. Add at least those of the potential group members that match the logic, and are not already present, to an appropriate one of the corresponding security groups; remove those that do not match. Apply security to the resulting updated security groups with the security portion, and distribute content accordingly.

21 Claims, 16 Drawing Sheets

(56) References Cited

OTHER PUBLICATIONS

Anonymous, Wikipedia, Content Repository API for Java, downloaded Apr. 17, 2020 from https://en.wikipedia.org/wiki/Content_repository_API_for_Java, pp. 1-3.
Anonymous, Wikipedia, JSON, downloaded May 21, 2020 from JSON, pp. 1-15.
Anonymous, Adobe, Setup ContextHub for Personalization, downloaded Apr. 17, 2020 from https://docs.adobe.com/content/help/en/experience-manager-learn/sites/p . . . , pp. 1-3.

* cited by examiner

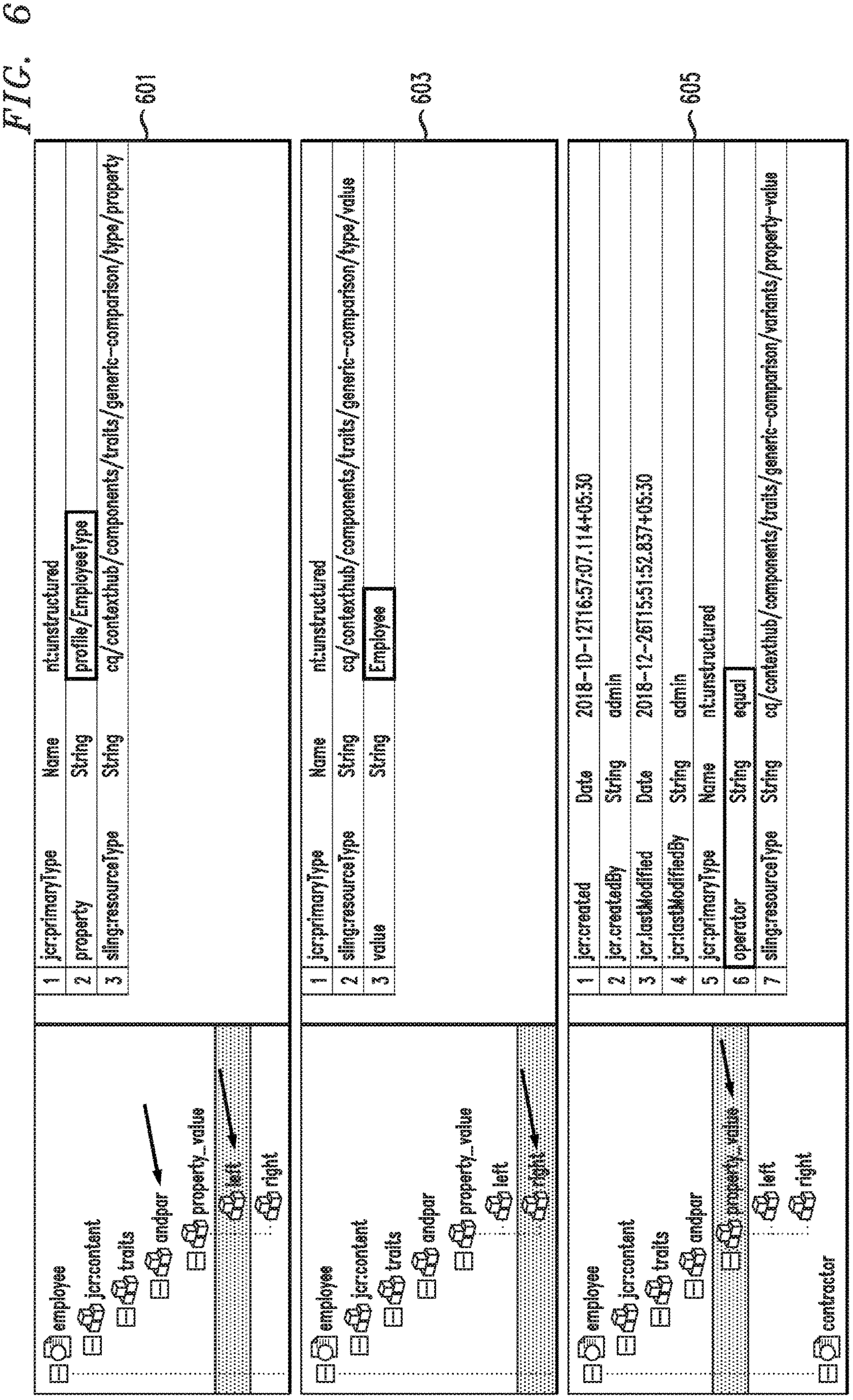

| | | | |
|---|---|---|---|
| 1 | jcr:primaryType | Name | nt:unstructured |
| 2 | property | String | profile/EmployeeType |
| 3 | sling:resourceType | String | cq/contexthub/components/traits/generic-comparison/type/property |

- employee
  - jcr:content
    - traits
      - andpar
        - property_value
          - left
          - right

603

| | | | |
|---|---|---|---|
| 1 | jcr:primaryType | Name | nt:unstructured |
| 2 | sling:resourceType | String | cq/contexthub/components/traits/generic-comparison/type/value |
| 3 | value | String | Employee |

- employee
  - jcr:content
    - traits
      - andpar
        - property_value
          - left
          - right

605

| | | | |
|---|---|---|---|
| 1 | jcr:created | Date | 2018-10-12T16:57:07.114+05:30 |
| 2 | jcr:createdBy | String | admin |
| 3 | jcr:lastModified | Date | 2018-12-26T15:51:52.837+05:30 |
| 4 | jcr:lastModifiedBy | String | admin |
| 5 | jcr:primaryType | Name | nt:unstructured |
| 6 | operator | String | equal |
| 7 | sling:resourceType | String | cq/contexthub/components/traits/generic-comparison/variants/property-value |

- employee
  - jcr:content
    - traits
      - andpar
        - property_value
          - left
          - right
- contractor

*FIG. 7*
AND
Comparing: Property "profile/EmployeeType"equal "Employee"
AND
OR
Comparing: Property "profile/Position"equal "MGR"
OR
Comparing: Property "profile/Position"equal "SMR"
OR
Comparing: Property "profile/Position"equal "SEV"
703
701
705
707
709

FIG. 12

```
/conf/panorama/settings/wcm/segments/manager-and-above/jcr:content/traits/andpar/operator_or   1201

[-] operator_or
    [-] orpar                                1203
        [+] property_value
        [+] property_value_1312504916
        [+] property_value_2096233789

Looking for operators in /conf/panorama/settings/wcm/segments/manager-and-above/jcr:content/traits/andpar/   1205
operator_or/orpar for manager-and-above [OR]
Found 3 operators

/conf/panorama/settings/wcm/segments/manager-and-above/jcr:content/traits/andpar/operator_or/orpar/property_value   1207
equal ... cq/contexthub/components/traits/generic-comparison/variants/property-value
Handling operator in /conf/panorama/settings/wcm/segments/manager-and-above/jcr:content/traits/andpar/operator_or/orpar/
property_value for manager-and-above [equal/OR]
Left = profile/Position
Right = MGR
```

FIG. 13

1301
```
/conf/panorama/settings/wcm/segments/manager-and-above/jcr:content/traits/andpar/operator_or/orpar/property_value_1312504916
equal ... cq/contexthub/components/traits/generic-comparison/variants/property-value
Handling operator in /conf/panorama/settings/wcm/segments/manager-and-above/jcr:content/traits/andpar/operator_or/orpar/
property_value_1312504916 for manager-and-above [equal/OR]
Left = profile/Position
Right = SMR
```

1303
```
/conf/panorama/settings/wcm/segments/manager-and-above/jcr:content/traits/andpar/operator_or/orpar/property_value_2096233789
equal ... cq/contexthub/components/traits/generic-comparison/variants/property-value
Handling operator in /conf/panorama/settings/wcm/segments/manager-and-above/jcr:content/traits/andpar/operator_or/orpar/
property_value_2096233789 for manager-and-above [equal/OR]
Left = profile/Position
Right = SEV
```

1305
```
profile/EmployeeType equals 'Employee'
AND
profile/Position equals 'MGR'
OR
profile/Position equals 'SMR'
OR
profile/Position equals 'SEV'
```

1307
```
______________________________Processing segment employee
EmployeeType equal Employee [AND]
User Value Matched: Employee

jsmith needs to be added to employee @ /home/groups/panorama/-AB-CD-efghij12345678
```

1309
```
______________________________Processing segment employee
EmployeeType equal Employee [AND]
User Value NOT Matched: Contractor
```

```
Object operatorsFile = new JSONParser().parse(new FileReader("operators" +
operatorBasePath.replace('/','_') + ".json"));
JSONObject operators = (JSONObject)operatorsFile;
System.out.printIn("Found" + (((Long) (operators.get("results")))).toString() + "operators");
JSONArray hits = (JSONArray) operators.get("hits");
```

2003

```
Iterator hitIterator = hits.iterator();
while (hitIterator.hasNext()) {
    JSONObject hit = (JSONObject)hitIterator.next();
    if (hit.get("jcr:path") != null) {
        String jcrPath = (String)hit.get("jcr:path");
        String jcrEndOfPath = jcrPath.substring(jcrPath.lastIndexOf('/') + 1);
        System.out.printIn((String)hit.get("jcr:path"));
        if (hit.get("sling:resourceType") != null) {
            if (hit.get("operator") != null) {
                System.out.printIn((String)hit.get("operator") + " ... " + (String)hit.get
("sling:resourceType"));
                if (((String) (hit.get("sling:resourceType"))).equals("cq/contexthub/components
/traits/generic-comparison/variants/property-value")) {
                    handleSegmentOperator(segmentName, (String)hit.get("operator"),
operator, operatorBasePath + "/" + jcrEndOfPath);
                }
            } else {
                if (((String) (hit.get("sling:resourceType"))).equals("cq/contexthub/components
/traits/generic-comparison/type/segment")) {
                    if (hit.get("segment") != null) {
                        lookForSegmentOperators(segmentName, operator, (String)
hit.get("segment") + "/jcr:content/traits/andpar");
                    }
```

2005

```
                } else {
                    String subOperatorType = jcrEndOfPath;
                    String subOperatorPath = "";
                    switch (subOperatorType) {
                        case "operator_or":
                                subOperatorType = "OR";
                                subOperatorPath = jcrPath + "/orpar";
                                break;
                        case "operator_and":
                                subOperatorType = "AND";
                                subOperatorPath = jcrPath + "/andpar";
                                break;
                    }
                    lookForSegmentOperators(segmentName, subOperatorType,
subOperatorPath);
                }
            }
        }
    }
}
```

2007
```
Object leftFile = new JSONParser() .parse(new FileReader("left.json"));
JSONObject left = (JSONObject)leftFile;
JSONArray hits = (JSONArray) left.get("hits");
Iterator hitIterator = hits.iterator();
while (hitIterator.hasNext()) {
      JSONObject hit = (JSONObject)hitIterator.next();
      if (hit.get("property") != null) {
            System.out.printIn("Left = " + (String)hit.get("property"));
            property = (String)hit.get("property");
            property = property.substring(property.lastIndexOf('/') + 1);
      }
}

...
```

2009
```
Object rightFile = new JSONParser().parse(new FileReader("right.json"));
JSONObject right = (JSONObject)rightFile;
hits = (JSONArray) right.get("hits");
hitIterator = hits.iterator();
while (hitIterator.hasNext()) {
      JSONObject hit = (JSONObject)hitIterator.next();
      if (hit.get("value") != null) {
            System.out.printIn("Right = " + (String)hit.get("value"));
            value = (String)hit.get("value");
      }
}
```

2011
```
segmentConditions.get(segmentName) .add(property + "/" + condition + "/" + value + "/" + operator);
```

*FIG. 16*

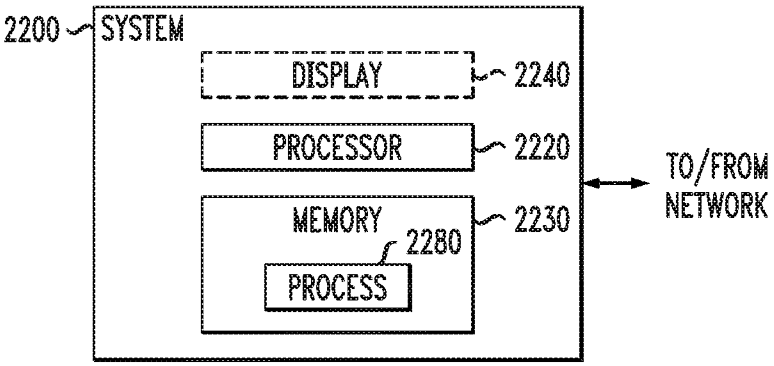

```
private Iterator<Resource> findSecuritySegments(Resource resource) {
    Map<String, String> map = new HashMap<>();
    map.put("type", "cq:Page");
    map.put("1_property", "jcr:content/isSecuritySegment");
    map.put("1_property.operation", "like");
    map.put("1_property.value", "true");
    map.put("path", PANORAMA_GROUP_SEGMENTS_PATH);
    map.put("p.limit", "-1");
```

2013

```
    final Session session = resource.getResourceResolver().adaptTo(Session.class);
    final QueryBuilder builder = resource.getResourceResolver().adaptTo(QueryBuilder.class);
    if(builder == null) {
        return null;
    }

    final Query query = builder.createQuery(PredicateGroup.create(map), session);
    Iterator<Resource> securitySegments = query.getResult().getResources();
    return securitySegments;
}
```

ENHANCING SECURITY IN A CONTENT MANAGEMENT SYSTEM

FIELD OF THE INVENTION

The present invention relates generally to the electrical, electronic, and computer arts, and more particularly relates to computerized content management systems and the like.

BACKGROUND OF THE INVENTION

A content management system (CMS) is a software tool that allows a content provider to quickly engage an audience with personalized experiences by increasing efficiency in authoring, creating, managing, and delivering content over one or more digital channels. One non-limiting example of a computerized content management system is Adobe Experience Manager (AEM) available from Adobe Inc., San Jose, Calif., USA.

In general, a CMS can be used for targeting content to be delivered to a large number of users. Some content may be more suitable for one subset of users, some for another subset of users, and so on. A modern CMS aids in this targeting process.

Security is also an issue in providing content to users. For example, only a subset of a large group of users may have the appropriate security level to receive certain items of content. Heretofore, mechanisms used within a CMS for targeting have not been conveniently available for use in security, and complex, error-prone and inconvenient manual techniques have been employed.

SUMMARY OF THE INVENTION

Techniques are provided for enhancing security in a content management system. In one aspect, an exemplary method includes the step of interposing a bridge component between a content targeting portion of a computerized content management system and a security portion of the computerized content management system. the content targeting portion has a plurality of targeting segments defined therein. Further steps include creating, with the bridge component, a plurality of corresponding security groups for at least a subset of the plurality of targeting segments for which pre-existing security groups have not been created; and, for the plurality of targeting segments, accessing, with the bridge component, underlying logic used by the content targeting portion to create the plurality of targeting segments, and using the underlying logic to determine whether each potential group member matches the underlying logic. Still further steps include adding at least those of the potential group members that match the underlying logic, and are not already present, to an appropriate one of the corresponding security groups; removing those of the potential group members that are currently members of the appropriate one of the corresponding security groups that do not match the underlying logic; applying security to the corresponding security groups with the users respectively added and removed, with the security portion of the computerized content management system; and distributing content with the computerized content management system in accordance with the targeting segments and the corresponding security groups.

In another aspect, an exemplary apparatus includes a memory; at least one processor coupled to the memory; and a non-transitory computer readable medium including computer executable instructions. When the instructions are loaded into the memory, they configure the at least one processor to perform operations including instantiating a content targeting portion of a computerized content management system and a security portion of the computerized content management system; and interposing a bridge component between the content targeting portion and the security portion. The content targeting portion has a plurality of targeting segments defined therein. Further operations carried out by the processor include creating, with the bridge component, a plurality of corresponding security groups for at least a subset of the plurality of targeting segments for which pre-existing security groups have not been created; for the plurality of targeting segments, accessing, with the bridge component, underlying logic used by the content targeting portion to create the plurality of targeting segments; and using the underlying logic to determine whether each potential group member matches the underlying logic. Still further operations carried out by the processor include adding at least those of the potential group members that match the underlying logic, and are not already present, to an appropriate one of the corresponding security groups; removing those of the potential group members that are currently members of the appropriate one of the corresponding security groups that do not match the underlying logic; applying security to the corresponding security groups with the users respectively added and removed, with the security portion of the computerized content management system; and distributing content with the computerized content management system in accordance with the targeting segments and the corresponding security groups.

As used herein, “facilitating” an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

Improved efficiency and accuracy in managing digital security across a large employee population;

Reduced risk of human error in security specification—indeed, targeting and security are traditionally done by two different areas of the business. Content personnel typically handle the targeting and information technology (IT) personnel typically handle the security. Advantageously, in one or more embodiments, the added consistency allows the content editors to be significantly more comfortable in understanding how their information will be secured and therefore more sensitive content can be safely included in the CMS when traditionally it would be a potential security risk.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 shows exemplary expansion of the database entries of FIG. 5, according to an aspect of the invention;

FIGS. 11, 12, and 13 show exemplary logic and code logging, according to an aspect of the invention;

FIGS. 14 and 15 show exemplary use of JAVA code using JSON (JavaScript Object Notation) for temporarily storing data when it comes out of the JCR for processing by one or more embodiments, according to an aspect of the invention;

FIG. 16 is a block diagram of a computer system useful in connection with one or more aspects of the invention; and FIG. 17 shows an exemplary code block for extracting segments, according to an aspect of the invention.

DETAILED DESCRIPTION OF PREFERRED EMBODIMENTS

One or more embodiments are applicable in a variety of contexts; a non-limiting example is a corporate intranet service. Such a service can have, for example, news articles, links to various resources, corporate policies, and the like. A company may typically roll such a service out to its employees to provide them access to a variety of company-related information. The term "employees" is used herein to broadly refer to all workers associated with an enterprise (both 1099 contractors and W-2 employees) as well as more specifically to W-2 employees as distinguished from contactors, as will be apparent to the skilled artisan from the context. There may be certain documents/policies that are "employees only (no contractors)," "VP and higher only," and the like ("VP"=vice president). Relevant concepts in one or more embodiments are targeting and security. For example, regarding security, only certain people may be entitled to view benefits information for a certain class of employee. In targeting, content can be surfaced but not necessarily secured. For example, "JOHN" may go to his home page and see certain content that is available to everyone, but it is desired that this content shows up first (be surfaced) for "JOHN." On the other hand, when "MARY" goes to her home page, she does not see the certain content (even though she is authorized to look at it) because it is less relevant for her than for "JOHN." That is to say, content can be targeted—its rank can be changed depending on the viewer.

In one or more embodiments, functionality is provided to permit authors of content to easily specify the category(ies) of personnel entitled to see certain content. One non-limiting example of a computerized content management system, in connection with which one or more embodiments can be employed, is Adobe Experience Manager (AEM) available from Adobe Inc., San Jose, Calif., USA. Consider, for example, a vice-president (VP) level benefits package—it would be desirable to be sure that the viewer is really a VP who is allowed to look at the content. According to a non-limiting example, an enterprise may have a security policy such that employees below VP level should not be allowed to see the content. One or more current content management systems may have rudimentary concepts of targeting and security; however, the capabilities may be somewhat disjointed. Internal information technology (IT)/communications personnel, in the example, would have to define "VPs and Higher" for targeting, but would also need to redefine that aspect for security purposes. In some popular current systems, it is not possible to have a singular definition of a person set; manual management is required. It thus becomes quite burdensome to manage security across a large employee population.

Figure 1:
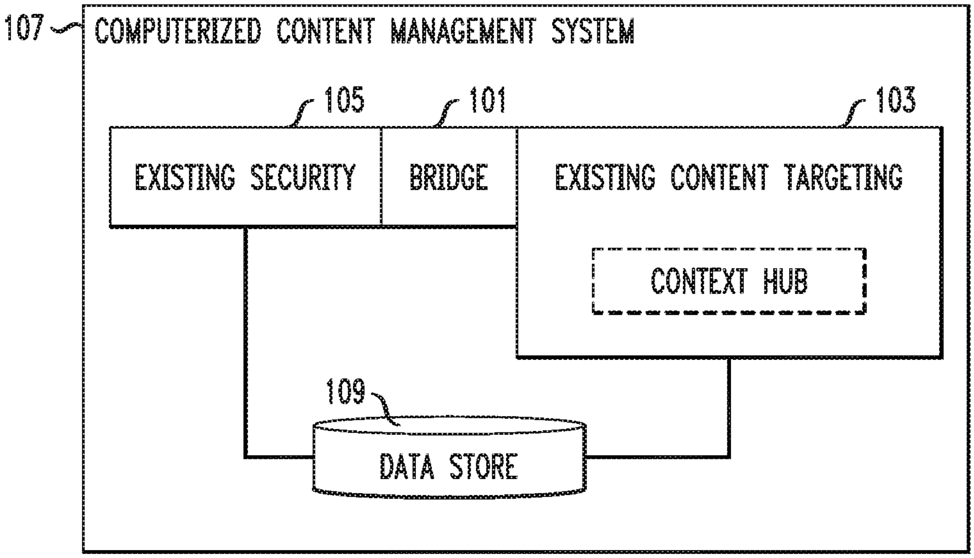
FIG. 1 is a block diagram of an exemplary system, according to an aspect of the invention.

As seen in FIG. 1, discussed in greater detail below, information from an employee data store 109 (a database is a non-limiting example; any kind of suitable data structure can be used) can be brought into a computerized content management system 107 such as AEM. In a non-limiting example, the database or other data store is part of the instance of AEM or other computerized content management system; for example, residing on a hard drive along with the instance. Currently, however, manual intervention is required with regard to the concepts of targeting and security. Both are available inside one or more current computerized content management systems but they are two separate pieces of functionality. If it is desired to target content for only VPs and higher, for example, internal IT/communications personnel need to perform the same action twice. In addition to inconvenience, this multiplies the chances of human error occurring. For example, the set of targeted individuals and the set of security-permitted individuals may be supposed to match, but may not match due to human error. Having to generate a definition of a user set twice (for targeting and security) is inconvenient and potentially introduces errors.

Indeed, there are many different scenarios that can be problematic with existing approaches. For example, perhaps it is only desired to target human resources (HR) personnel in St. Louis, Mo. but not in Charlotte, N.C. There can be a risk of showing content that should not be shown, or not showing content that should be shown. Further, with existing approaches, the IT/communications personnel may find that the security aspect is significantly more complex than the surfacing/targeting aspect.

AEM includes the concept of groups. A group (say "VPs and Above") is manually created. The group is then populated through AEM. The desired users must be manually added to the group. The group membership must be manually updated when people join or leave. This difficulty may be even more severe with larger groups such as "Contractors" versus "Employees." Keeping contractors and employees manually up to date in a corporate intranet service is a daunting task. While there is a capability in AEM to bring in Microsoft Active Directory groups, there is, however, a significant risk that the definitions could be different; i.e., security group members for VP and Higher may not be the same as defined in the targeting aspect. The people who control the logic of the members of a group are, in general, not the same people who define the targeting logic (in a large company this would be virtually certain). Indeed, the systems that control the logic can be different, for example, Active directory data may be different from the data pulled into the system from the human resources (HR) side and there are quite often differences typical in larger companies.

One or more embodiments overcome the deficiencies in the prior art by providing a solution wherein group members need to be specified only once for both security and targeting; wherein consistency is maintained between security and targeting lists; and wherein list construction can be completed in a reasonable amount of time, quicker than in prior art techniques. One or more embodiments do not require the use of a custom security model (this is advantageous because using a custom security model opens potential security holes into the CMS application as well as causing potential issues when areas of the CMS are upgraded—potentially causing a broken security system and/or possible security breaches).

Figure 5:
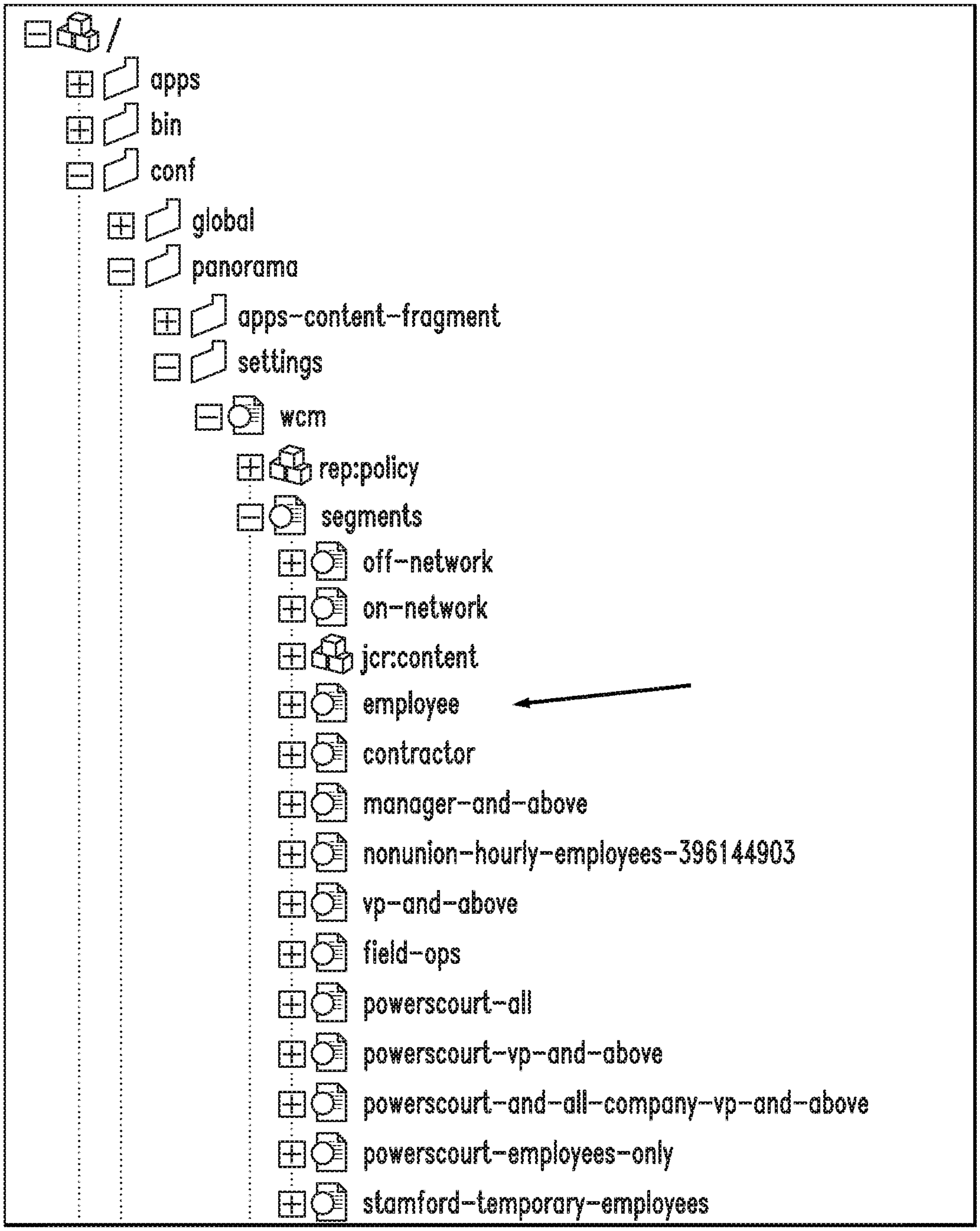
FIG. 5 shows a subset of an exemplary JCR (Java Content Repository) database, according to an aspect of the invention.

Referring to FIG. 1, one or more embodiments advantageously work with existing products such as Adobe AEM, providing a bridge 101 between the in-house content targeting 103 (Adobe AEM's out-of-the-box content targeting is a non-limiting example) and existing security functionality 105 (Adobe AEM's proven out-of-the-box security functionality is a non-limiting example). One or more embodiments utilize a locally-stored JCR (Java Content Repository) database (e.g. 109; FIG. 5, discussed further below, gives exemplary entries). As will be appreciated by the skilled artisan, the JCR is how the Adobe AEM product stores data; for example, source information such as the users and the folders in FIG. 3, the folders in FIG. 5, and the like. This, in itself, is standard AEM functionality; the process manages the groups and the members of those groups in exactly the same way as they would be manually defined. However, one or more embodiments advantageously provide an inventive bridge 101 between those two disparate concepts.

Furthermore in this regard, the AEM has groups that can be defined manually or programmatically, as well as targeted segments that allow targeting content to individuals based on their characteristics, but which currently do not permit defining security in a similar manner.

In a non-limiting example, start off with the existing content targeting 103. Create a segment (term of art in AEM—a segment is the definition of a set of attributes that a user should mean to be included in the 'targeted' group) that defines people with position level VP and above. Access the back end of AEM utilizing the JCR, and obtain a list of all the segments. The segments can be simple, e.g., "is the position level=CEO?" The segments can also be more complicated, e.g., "VP and above" includes *VP, COO, CEO, etc. (* is a wildcard here, COO=chief operating officer, CEO=chief executive officer). "AND" and "OR" functionality can also be employed in one or more embodiments; for example, VP AND Work Location=St. Louis. Segments can also reference other segments. For example, Segment 1=all people that work in St. Louis, and Segment 2=all VP and higher people who work for the company; define Segment 3 to include those who are members of both Segment 1 and Segment 2. This can involve complex nesting in one or more embodiments. One or more embodiments build up logic that identifies the segments and the AND/OR functionality that is required in a given case. A new group is created (i.e. if the segment has not been processed before) and the users who should be included in that group are identified, and any who do not belong in the group (e.g., have left company, have changed location within company, have gotten demoted) are removed. Thus, the segments are processed and built up into groups, and the correct users are associated with those groups. The standard AEM security model 105 is then used to specify which groups should have access to which documents (or indeed any asset(s) within the system; documents are a non-limiting example).

In one or more embodiments, once groups are created and users are assigned to the groups, existing security functionality 105 of a computerized content management system such as AEM is employed. The targeting mechanism 103 determines that a certain item should be high in the list for a certain group of people. In one or more embodiments, a similar mechanism is employed to create security groups, including the correct people, that can be used with the standard AEM model. One or more embodiments provide the aforementioned inventive bridge 101 between the two concepts, within a computerized content management system such as AEM.

One or more embodiments advantageously provide automated assignment of content management system group memberships for security purposes based on the targeting segmentation rules. One or more embodiments permit the security mechanism to be edited/maintained using the same system as the content targeting (which typically uses the same data points; many of them can be used for both security AND targeting). One or more embodiments make use of the data structures (e.g. 109, with entries such as those in FIG. 5) in the backend and process the logic to build a set of rule conditions that can be used to check each user; if the user meets the conditions, the user is added to a content management system group that can then be used to assign permissions. The assignment of permissions can be carried out conventionally using the existing (e.g. AEM) security 105.

The context hub is essentially the functional aspect of existing content targeting system 103, and is an example of functionality in a computerized content management system currently used for targeting content. For simplicity, reference is simply made to element 103 hereafter. The ContextHub JavaScript API (application programming interface) of AEM is a non-limiting example of a hub 103. Some applications use the same sorts of rules for security as well. One or more embodiments provide techniques to reconcile the two and allow the context hub mechanism to also be used by the content team to secure content. Using logic techniques and JCR queries, it is possible to pull out the logic created in the context hub segments and use the rules to build a set of user groups and automatically assign people, based on those rules, to be members of the group. These groups can then be used to set permissions on any area of the system. One or more embodiments obtain logic from the context hub 103. Context hub 103 is a framework for storing, manipulating, and presenting context data. Hub 103 enables the user to access data stores to create, update, and delete data as necessary.

Figure 4:
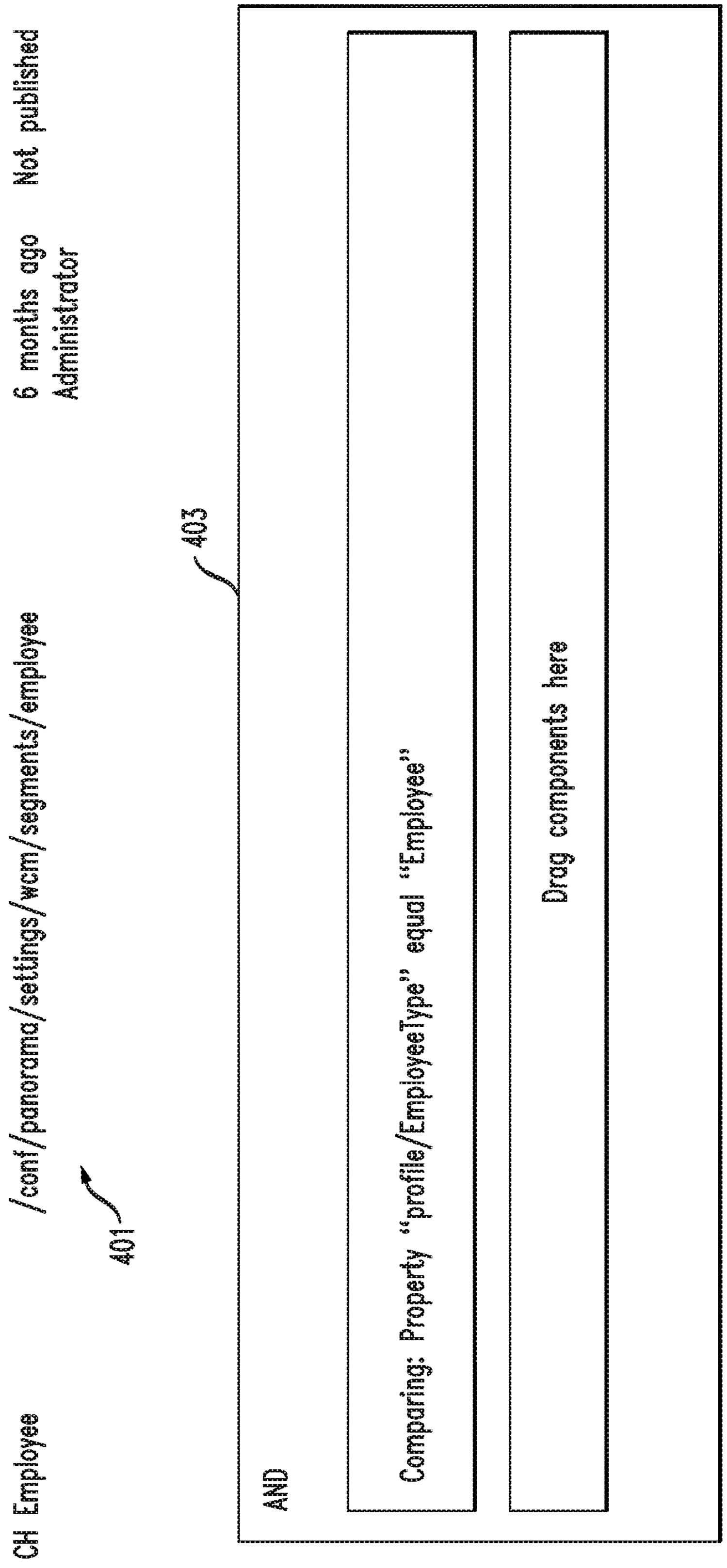
FIG. 4 shows an example of logic in a context hub, according to an aspect of the invention.

In one or more embodiments, obtaining the logic can be thought of in terms of data mining; e.g. analogously to a web crawler that crawls a web site to carry out indexing. The system accesses the group segments and follows that logic down, building up a pattern of the defined logic. One or more embodiments iterate down through the tree structure of the back end of the context hub segments to obtain logic. Further regarding obtaining the logic, rather than a "query" the process can be visualized more in terms of code snippets. FIG. 4 is a non-limiting example of the logic in the context hub. When the user logs into a computerized content management system such as AEM, the identity of the user is known and the user has a user profile, including, e.g., the attribute "employee type." If the employee type is, e.g., "employee," then certain information will be targeted to the individual. Suppose the person is interested in accessing the "benefits" sub-site. Only (W-2) employees (not contractors) should be allowed access to this sub-site, for example. Therefore, it is desired not only to target such content, but also to secure it. Currently in AEM, a manual security group including all employees would have to be created and the benefits sub-site would not be shown to contractors (in a typical application in a large enterprise there could be, for example, more than 90,000 users, rendering such a manual technique impractical). In contrast, in one or more embodiments, the logic of the targeting system is used to identify people as employees for security purposes.

Figure 2:
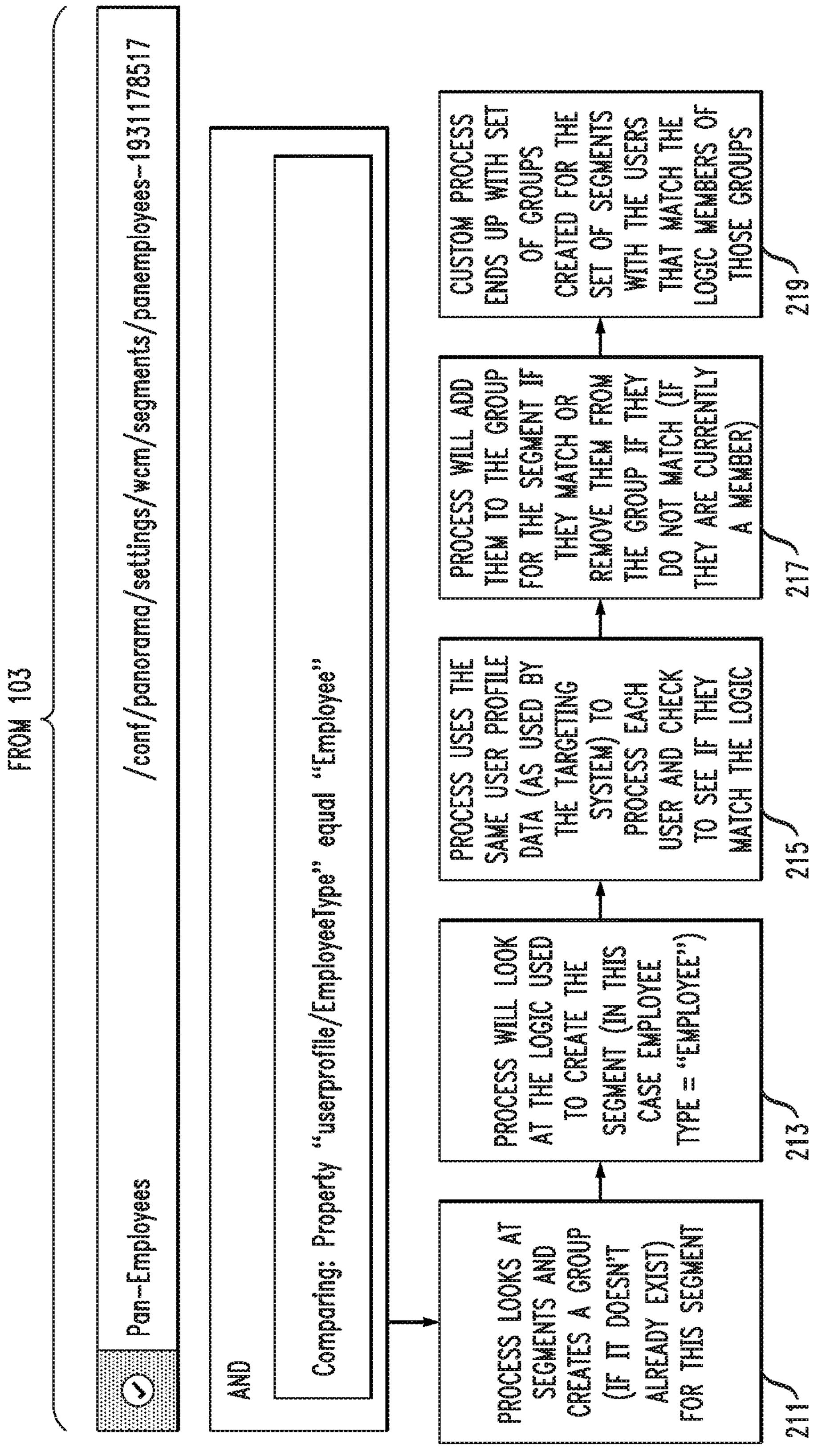
FIG. 2 is a flow chart of an exemplary method, according to an aspect of the invention.

Referring also now to FIG. 2, in step 211, based on the name/folder structure of each segment, determine if that segment should be used for security, and if so, make sure a group is created for it (if not then create a group). Note that the top portion of FIG. 2 refers to use of built-in targeting functionality 103 of a computerized content management system such as AEM or the like, which has a built in targeting engine that allows the users to select, e.g., everyone with the employee type of 'Employee' to match this segment. Steps 211, 213, 215, 217, 219 are performed by bridge 101. In step 213, iterate through the logic used to create each segment and define a set of rules that will be used, in the next step, to match each user against (i.e. compare each user against the rules to look for a match). In step 215, match each user against the set of rules defined in the previous step to determine if the user should be part of the security group. If the user's attributes indicate that the user matches the criteria and the user is NOT in the group, then add the user in step 217; if the user's attributes indicate the user does NOT match the criteria and the user IS a member of the group, then remove the user from the group membership. As per step 219, the custom process ends up with a set of groups created for the set of segments with the users that match the logic members of those groups. In a non-limiting example, segments are created in the 'Audience' section of the AEM author.

Figure 3:
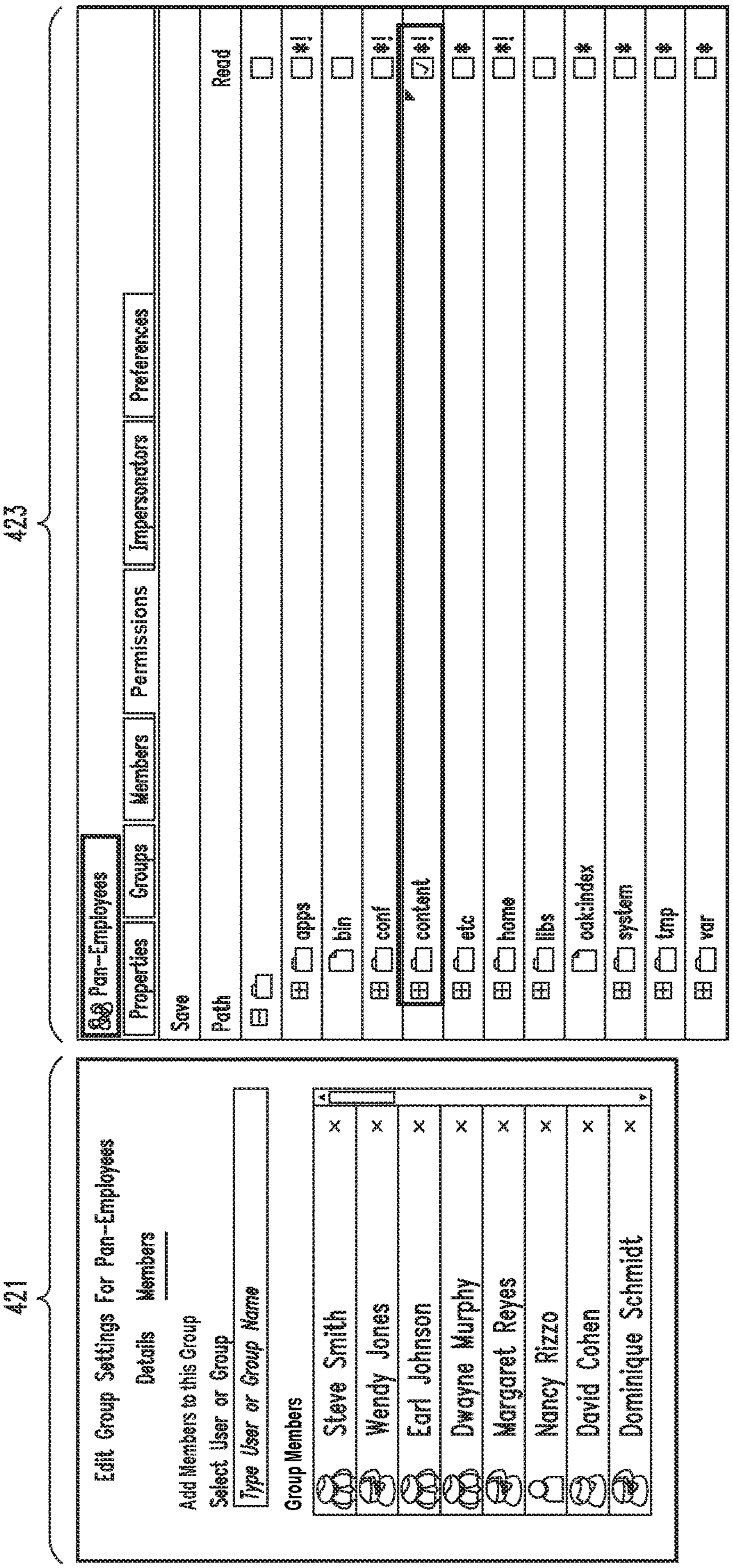
FIG. 3 shows an exemplary security set-up for an example of a group that an exemplary system will create and/or update automatically, according to an aspect of the invention.

FIG. 3 depicts functionality carried out by the built-in security system 105 of a computerized content management system such as AEM or the like, having a built-in mechanism for allowing groups to be created and then assigning permissions to folders or other section(s) of content. FIG. 3 depicts a group with members at 421 and then at 423 a screen shot of functionality that allows the system to be told that this group has read access to the folder 'content.' Everyone who is a part of the group "Pan-Employees" will have access to read the 'content' folder.

FIG. 4 shows what the targeting system segment looks like when editing in the "audiences" section of AEM; 401 shows the segment created called 'Employee" and in 403, showing the logic for that segment, it can be seen that there is a simple matching that the 'profile/EmployeeType' attribute equals the word 'Employee.' This is then stored in the back-end JCR (e.g. 109) as shown by the callout arrow in FIG. 5 which shows that the segment defined ('Employee' has an ID (ID=identifier), indicated also in 401 with a path) is listed as one of the segments stored in the backend JCR. This can be expanded out as seen in FIG. 6. The comparison can be classed as an AND (hence the 'andpar' at 601 in FIG. 6). As seen at 601 in FIG. 6, the left is the left-hand side of the equation in this case 'profile/EmployeeType.' As seen at 603 in FIG. 6, the right-hand side is listed in the right section; as can be seen, it says 'Employee.' Finally, at 605 in FIG. 6, it is desired to know the operator which is found at the 'property_value.' Thus, from this example, it can be seen how the JCR breaks down the logic for the segments; one or more embodiments read that logic and then employ it to test each user to see if the user matches the criteria as defined by the targeting segment. In the specific example here, the left-hand side=employee type, the right-hand side=employee, and the logic matches if the left and right-hand sides are equal ("equal" operator).

Figure 7:
FIG. 7 and FIG. 8 show exemplary logic, according to an aspect of the invention.
Figure 8:
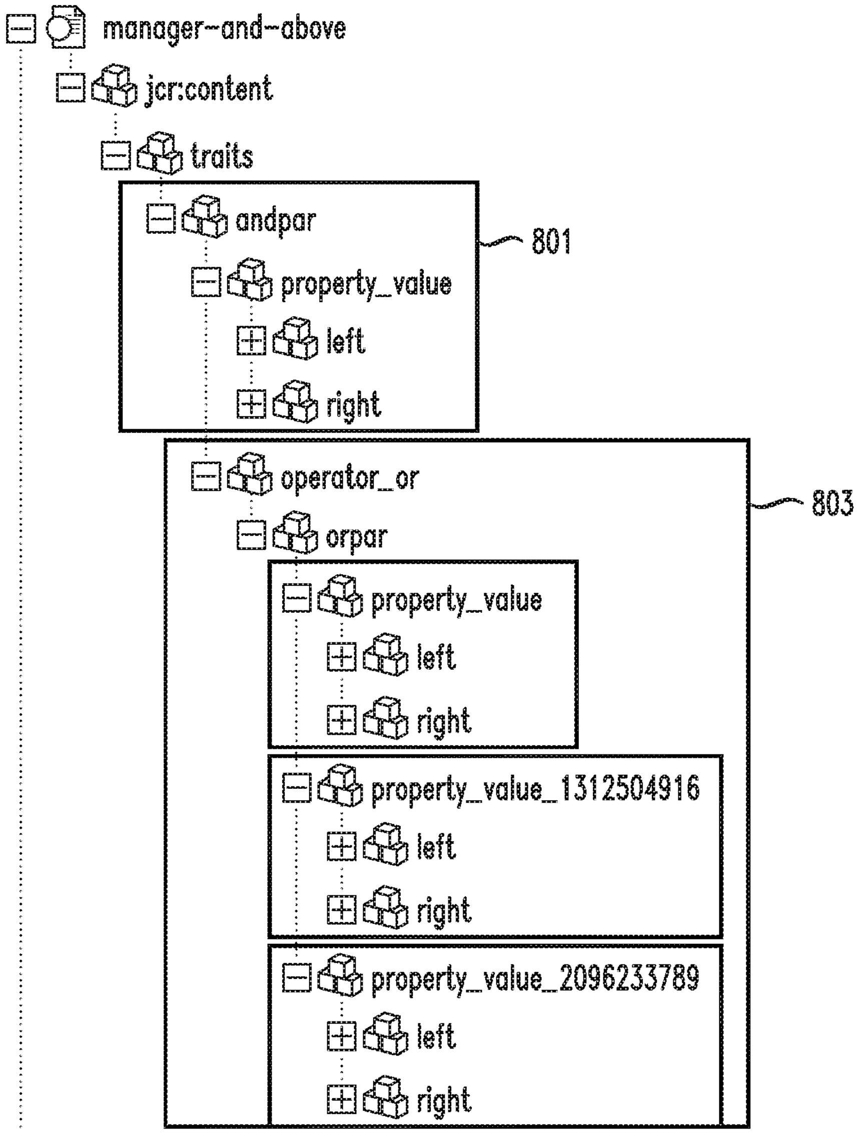

Referring to FIGS. 7 and 8, more complexity can be added as needed. Consider another example, "manager and above." It can be seen that there is an OR condition 701 here as well as the AND condition 703 that are required to be processed; the backend JCR segment is shown in FIG. 8. Note the AND 703, similar to the first example, then note also the OR 701 as well inside the main AND statement. Further note the three separate properties 705, 707, 709 for the OR check (if these are expanded further, the individual items have exactly the same principles as the previous simple example). FIG. 7 is the logic. First, check whether the individual is an employee, then a number of ORs are present to check for types of position equal to MGR, SMR, or SEV. The OR condition is satisfied if any of those are true. FIG. 8 is the corresponding back-end logic—the AND is seen in box 801 at the top with three non-exclusive ORs underneath in the box 803. Logic requires satisfying the AND, and any one of the three ORs. The overall requirement is that the person be an employee and have a title of manager or above.

Figure 9:
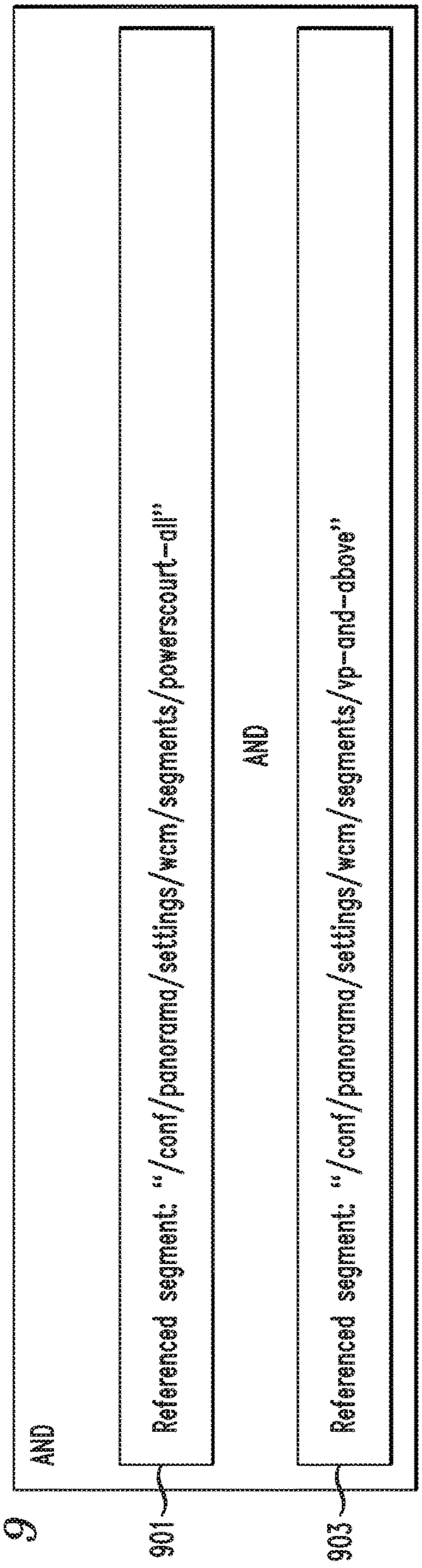
FIG. 9 and FIG. 10 show referenced segments, according to an aspect of the invention.
Figure 10:
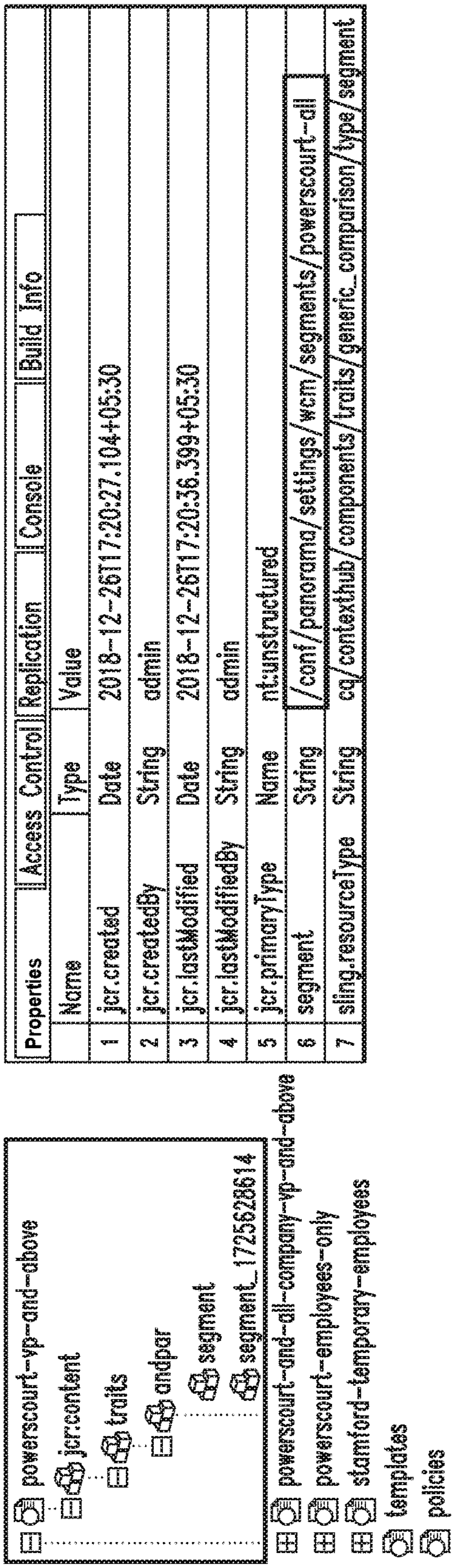

Referring now to FIG. 9, another other level of complexity is introduced in the recursive concept of referenced segments. In the example of FIG. 9, for 'Powerscourt VP and above,' it can be seen that it is made up of two referenced segments 901 and 903. Referring also to FIG. 10, in the backend, these segments are also referenced. FIG. 10 demonstrates that in some embodiments, the process can also take a segment that references another segment. In FIG. 10, if the individual matches "Powerscourt" and "VP and above" then the individual also matches the particular segment under discussion. A similar kind of logic exists at the top of the segment, but then further in, it can be seen how the AND includes two segments, as well as the path for one of the segments demonstrated before. This makes the logic more complicated because it typically requires going back and processing these child segments in order to match against the user. Thus, there are a number of complexities to overcome with the consumption of the segments to make the system work. Furthermore in this regard, suppose it is desired to target/secure based on employee category VP and above, and a segment is also needed which defines if individual is in location "Powerscourt"—say there is a fire drill upcoming or the office will be closed for repairs the next day. Both of these aspects are defined but it is also desired to be able to target/secure specific things in the Powerscourt location to ONLY VP or above. For example, suppose the CEO was visiting and the relevant individuals need to be prepared for it. One could define that as a new segment with the complex logic, but then the same definition process would be needed in other locations such as in Charlotte, Riverport, etc. There may also be employee categories of manager and above, and perhaps contractors in those locations. This can rapidly lead to excess complication with a plethora of segments. However, the two segments Powerscourt and VP and Above are already created—the system knows if an individual fits in the segment for Powerscourt and it also knows if the individual fits in the segment of VP and above—the aspect of referenced segments advantageously allows these segments to re-used while still being able to pick through the logic to ultimately fill a group in the same way.

EXAMPLES

Figure 11:
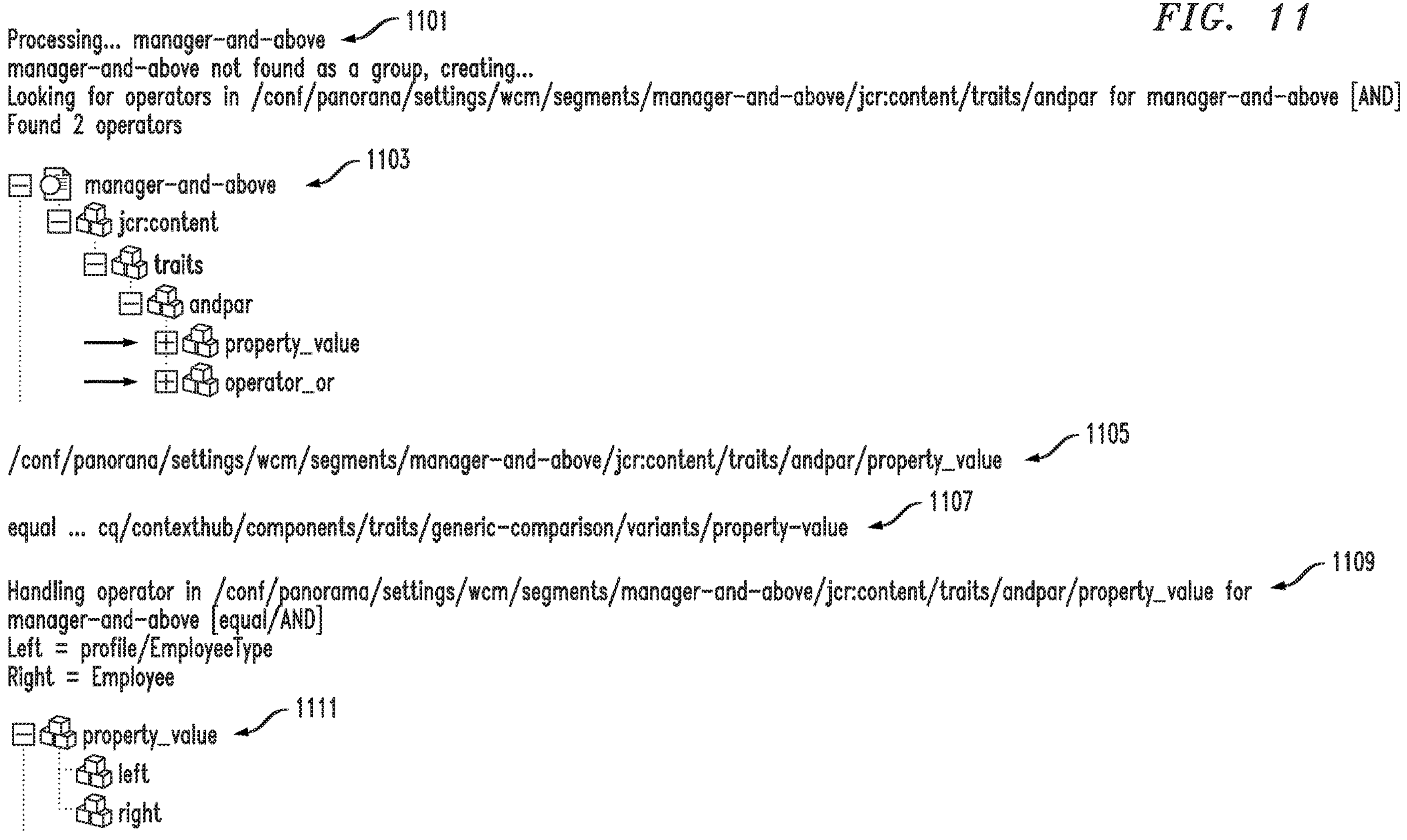

Referring now to FIG. 11, considering "manager and above," the four lines 1101 in FIG. 11 at the top are exemplary snippets of output showing that it has found two operators. The second grouping 1103 in FIG. 11 shows the two operators that have been found (property_value and operator_or) for this segment. Line 1105 shows the path to the property value that has been found in 1103. Line 1107 shows the fact that the operator found is an "equals" operator. Lines 1109 show the complete logic: left-hand side=profile/EmployeeType, right-hand side=Employee, and operator is AND. Thus, the condition has been found with both left- and right-hand sides. Finally, 1111 shows the breakdown of the first operator found showing it has the sub elements of left and right which were found and used to build the login in 1109. Referring now to FIGS. 12 and 13, as seen at 1201, process the OR that has been found. The process then continues on to the next operator it found previously which is the 'OR' as shown in 1201. As seen at 1203, the operator is OR and there are three OR statements. Lines 1205 show the process declaring that it has found the three operators shown in 1203. These relate to the three exclusive ORs previously broken down in FIG. 8. In lines 1207, the process works through the logic (profile/Position=MGR). The other two OR statements are processed in lines 1301 (SMR) and 1303 (SEV) in the same way. The final logic is shown in lines 1305: the condition is satisfied if the EmployeeType=Employee AND any one or more of the three OR statements is satisfied.

When looking into the section that deals with the users, snippets such as at 1307 can be seen. It is fairly simple to work through the segment for 'employee' that was shown earlier. Next is the condition it is desired to match; it can be seen that the user matched here so the program will add that user to the group for the employee segment. In lines 1307, the system uses the logic to go through the employees, searching for EmployeeType=Employee and locating "jsmith." Snippet 1309 at the bottom of FIG. 13 shows a similar section for someone who did not match. It can be seen that the user has an employee type of 'Contractor' that does not match 'employee,' so this user is not added to the group.

Refer back to "Found 2 operators" in the last line of 1101 and compare to FIG. 14, at 2001, the line beginning System.out.println. FIG. 14 shows exemplary code snippets that can be implemented outside of a computerized content management system such as AEM; however, the logic disclosed therein can be transposed into (i.e. can also be implemented inside) a computerized content management system such as AEM to enhance performance, if desired. At 2001, a number of operators have been found under a particular group; these operators are then processed. A simple or regular operator such as "EmployeeType =Employee," is handled as a simple operator. On the other hand, if the operator is a segment rather than a simple operator (e.g. "PowerscourtAll and VP or Above," the operator is handled as a segment operator. Code segment 2003 shows a loop to determine whether found operators are simple operators or segment operators. Simple operators "OR" and "AND" are processed at 2005. Note that the example of FIG. 14 uses JSON (JavaScript Object Notation) to extract the data. Given the teachings herein, the skilled artisan will appreciate that there are other ways to achieve the goal of extracting the data out of the JCR to be used in the process. The logic cycles through the operators found in the segments. If what was found is a segment itself (i.e. a referenced one) the path is adjusted to start from the new segment. Based on the children, proceed to go deeper by calling the same method again with a lower path, or, if an actual operator is found, then process it. Keep track of the ANDs and ORs to build the logic correctly.

The example block of FIG. 15 shows additional aspects of handling operators. Code 2007 shows obtaining the left-hand side (e.g. EmployeeType) from a JSON file leftFile, while code 2009 shows obtaining the right-hand side (e.g. Employee) from a JSON file rightFile. The last line 2011 shows the property EmployeeType, the condition (in this case, "AND"), the value Employee, and the operator (in this case, "equals"). The logic is collected and when the individual is processed, since the EmployeeType is Employee, the individual is added to the "Employee" group. Note that FIG. 15 also depicts parsing JSON. Obtain the property for the left side and the value for the right. Since it is already known what the operator is, the operator can be stored away for use later on as part of a large list of conditions for the segment. As before, keeping track of the AND vs. OR is pertinent.

Referring now to FIG. 17, as an alternative to the JSON technique depicted in FIGS. 14 and 15, standard AEM (or other content management system) functionality can be used to extract the segments using a block of code as shown; for example, it can be specified whether or not a segment was to be used for security (code 2012). Then, the process proceeds in a similar fashion as discussed elsewhere herein, with the document processing each one of the segments found and implementing the logic noted. Given the teachings herein, the skilled artisan will be able to adapt known aspects of AEM (or other content management system) to implement 'querying' and processing items in the database (i.e. the JCR in 109 in this case) (see construction of queries at 2013).

Given the discussion thus far, it will be appreciated that an exemplary method, according to an aspect of the invention, includes interposing a bridge component 101 between a content targeting portion 103 of a computerized content management system and a security portion 105 of the computerized content management system. The content targeting portion has a plurality of targeting segments defined therein (the top portion of FIG. 2 is a non-limiting example). Segments are created, for example, in the 'Audience' section of the AEM author. A further step 211 includes creating, with the bridge component 101, a plurality of corresponding security groups (see FIG. 3) for at least a subset of the plurality of targeting segments for which pre-existing security groups have not been created. Further processing includes, as at 213, for the plurality of targeting segments, accessing, with the bridge component, underlying logic used by the content targeting portion to create the plurality of targeting segments, and, as at 215, using the underlying logic to determine whether each potential group member matches the underlying logic.

Step 217 includes adding at least those of the potential group members that match the underlying logic, and are not already present, to an appropriate one of the corresponding security groups, as well as removing those of the potential group members that are currently members of the appropriate one of the corresponding security groups that do not match the underlying logic. Adding at least those of the potential group members that match the underlying logic, and are not already present" means adding those that match and are not already in the group, optionally adding some or all of those that are already present (e.g., in a case where duplicate entries can be tolerated or dealt with in some other manner and/or at a later time). Other embodiments could be limited to adding those that match and are not already present. Referring to step 219, another step includes applying security to the corresponding security groups with the users respectively added and removed, with the security portion of the computerized content management system. Content is then distributed with the computerized content management system in accordance with the targeting segments and the corresponding security groups.

In one or more embodiments, the majority of the steps are carried out with bridge component 101, with content targeting system 103 used to create the segments processed from the targeting and then turned into groups for the security system 105 to use.

It is worth noting that security is not necessarily applied after the fact; rather, in one or more embodiments, AEM security functionality is applied to the group, regardless of whether the group was made manually (prior art) or using aspects of the invention. For example, only members of the "Employee" group can see the benefits page. One or more embodiments use a standard AEM security model to apply permissions to group.

Bridge 101 can include software that implements the functionality as describe in the figures; for example, using logic depicted in FIGS. 14-15 or FIG. 17. Components 103, 105 can, for example, be part of existing software such as AEM. Data store 109 includes non-volatile memory shared by the components. Context hub 103 includes known functionality in a computerized content management system used for targeting content. The ContextHub JavaScript API (application programming interface) of AEM is a non-limiting example of a hub 103.

In one or more embodiments, accessing the underlying logic includes accessing a Java Content Repository (JCR) data store 109 to obtain the underlying logic from a context hub 103 of the targeting portion of the computerized content management system, by iterating through a tree structure of a back end of context hub segments to obtain the underlying logic. Refer to the technique illustrated in FIG. 2 applied to the JCR structure discussed and illustrated elsewhere herein.

In one or more embodiments, the bridge 101 is interposed between components 103, 105 via components 103, 105 sharing the data store 109 with the bridge component 101. In addition to sharing data, interposing the bridge component can involve a variety of approaches. For example, viewed in the context of a traditional load/execute paradigm, existing components 103, 105 can be loaded into memory first, and then bridge 101 can be loaded. Alternatively, all components can be loaded together. More generally, in one or more embodiments, elements 103 and 105 are part of an existing CMS such as AEM and so would be in the backend database used by AEM (or other content management system). The process is code that is ultimately also part of the AEM (or other content management system) because it typically would be added to AEM (or other content management system) as part of an overall application package into the software that defines the rest of the implantation. However, the bridge 101 can be stored outside of AEM (or other content management system) and then different techniques can be used to extract the data from the underlying database used by AEM (or other content management system). It can then be processed and used to run commands to update AEM (or other content management system) externally, thus creating groups and adding/removing people. Integration into the AEM (or other content management system) code base will, however, generally provide much quicker access to the data.

In one or more embodiments, in the interposing step, the targeting segments are defined in the Java Content Repository (JCR) data store 109, and/or, in the creating step, the security groups are created in the Java Content Repository (JCR) data store 109.

In some instances, accessing the underlying logic includes parsing JavaScript Object Notation (JSON), as described with respect to FIGS. 14 and 15.

In other instances, accessing the underlying logic includes using existing functionality within said computerized content management system (refer to FIG. 17 and accompanying text).

In one or more embodiments, in the interposing step, the plurality of targeting segments identify content of interest to individuals. Application of the security can include, for example, allowing access (to content) to those of the users remaining after the users are respectively added and removed, and/or denying access (to content) to those of the users not remaining after the users are respectively added and removed.

It is worth reiterating that, in one or more embodiments, the definition of the actual permissions on the groups defined via bridge 101 are standard AEM (or other CMS) procedure and defined on the groups regardless of whether the groups per se were created manually or via the inventive bridge 101. The logic defined in the bridge efficiently adds/removes users to/from groups while the standard AEM (or other CMS) security model can be employed.

In another aspect, referring to FIG. 1 and FIG. 16 (discussed further below), an exemplary apparatus includes a memory (e.g. a RAM portion of memory 2230), at least one processor 2220, coupled to the memory; and a non-transitory computer readable medium (e.g. a hard drive portion of memory 2230) including computer executable instructions which when loaded into the memory configure the at least one processor to perform any one, some, or all of the operations described herein. The operations can include instantiating the software components depicted in the figures.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps (e.g., when instructions on a computer program product are loaded into the memory).

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

FIG. 16 is a block diagram of a system 2200 that can implement at least some aspects of the invention, such as the components shown in FIG. 1. As shown in FIG. 16, memory 2230 configures the processor 2220 to implement one or more methods, steps, and functions (collectively, shown as process 2280 in FIG. 22). The memory 2230 could be distributed or local and the processor 2220 could be distributed or singular. Different steps could be carried out by different processors.

The memory 2230 could be implemented as an electrical, magnetic or optical memory, or any combination of these or other types of storage devices. It should be noted that if distributed processors are employed, each distributed processor that makes up processor 2220 generally contains its own addressable memory space. It should also be noted that some or all of computer system 2200 can be incorporated into an application-specific or general-use integrated circuit. For example, one or more method steps could be implemented in hardware in an ASIC or via a field-programmable gate array (FPGA) rather than using firmware. Display 2240 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 2200 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server or other computer implementing the components of FIG. 1 or the like, and that such program may be embodied on a tangible computer readable recordable storage medium. As used herein, including the claims, unless it is unambiguously apparent from the context that only server software is being referred to, a "server" includes a physical data processing system (for example, system 2200 as shown in FIG. 16) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the components in FIG. 1). The method steps can then be carried out using the distinct software modules of the system, as described above, executing on one or more hardware processors 2220. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium.

Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

interposing a bridge component between a content targeting portion of a computerized content management system and a security portion of said computerized content management system, said content targeting portion having a plurality of targeting segments defined therein;

creating, with said bridge component, a plurality of corresponding security groups for at least a subset of said plurality of targeting segments for which pre-existing security groups have not been created;

for said plurality of targeting segments, accessing, with said bridge component, underlying logic used by said content targeting portion to create said plurality of targeting segments, and using said underlying logic to determine whether each potential group member matches said underlying logic;

adding at least those of said potential group members that match said underlying logic, and are not already present, to an appropriate one of said corresponding security groups;

removing those of said potential group members that are currently members of said appropriate one of said corresponding security groups that do not match said underlying logic;

applying security to said corresponding security groups with said users respectively added and removed, with said security portion of said computerized content management system; and distributing content with said computerized content management system in accordance with said targeting segments and said corresponding security groups.

2. The method of claim 1, wherein accessing said underlying logic comprises accessing a Java Content Repository (JCR) data store to obtain said underlying logic from a context hub of said targeting portion of said computerized content management system, by iterating through a tree structure of a back end of context hub segments to obtain said underlying logic.

3. The method of claim 2, wherein said interposing includes said content targeting portion and said security portion sharing said Java Content Repository (JCR) data store with said bridge component.

4. The method of claim 3, wherein, in said interposing step, said targeting segments are defined in said Java Content Repository (JCR) data store.

5. The method of claim 4, wherein, in said creating step, said security groups are created in said Java Content Repository (JCR) data store.

6. The method of claim 5, wherein accessing said underlying logic comprises parsing JavaScript Object Notation (JSON).

7. The method of claim 5, wherein accessing said underlying logic comprises using existing functionality within said computerized content management system.

8. The method of claim 5, wherein, in said interposing step, said plurality of targeting segments identify content of interest to individuals.

9. The method of claim 8, wherein said applying of said security comprises allowing access to those of said users remaining after said users are respectively added and removed.

10. The method of claim 8, wherein said applying of said security comprises denying access to those of said users not remaining after said users are respectively added and removed.

11. An apparatus comprising:

a memory;

at least one processor coupled to said memory; and a non-transitory computer readable medium comprising computer executable instructions which when loaded into said memory configure said at least one processor to perform operations comprising:

instantiating a content targeting portion of a computerized content management system and a security portion of said computerized content management system;

interposing a bridge component between said content targeting portion and said security portion, said content targeting portion having a plurality of targeting segments defined therein;

creating, with said bridge component, a plurality of corresponding security groups for at least a subset of said plurality of targeting segments for which pre-existing security groups have not been created;

for said plurality of targeting segments, accessing, with said bridge component, underlying logic used by said content targeting portion to create said plurality of targeting segments, and using said underlying logic to determine whether each potential group member matches said underlying logic;

adding at least those of said potential group members that match said underlying logic, and are not already present, to an appropriate one of said corresponding security groups;

removing those of said potential group members that are currently members of said appropriate one of said corresponding security groups that do not match said underlying logic;

applying security to said corresponding security groups with said users respectively added and removed, with said security portion of said computerized content management system; and distributing content with said computerized content management system in accordance with said targeting segments and said corresponding security groups.

12. The apparatus of claim 11, wherein said instantiating further comprises instantiating a Java Content Repository (JCR) data store and wherein said accessing comprises accessing said Java Content Repository (JCR) data store to obtain said underlying logic from a context hub of said targeting portion of said computerized content management system, by iterating through a tree structure of a back end of context hub segments to obtain said underlying logic.

13. The apparatus of claim 12, wherein said interposing includes said content targeting portion and said security portion sharing said Java Content Repository (JCR) data store with said bridge component.

14. The apparatus of claim 13, wherein said targeting segments are defined in said Java Content Repository (JCR) data store.

15. The apparatus of claim 14, wherein said security groups are created in said Java Content Repository (JCR) data store.

16. The apparatus of claim 15, wherein accessing said underlying logic comprises parsing JavaScript Object Notation (JSON).

17. The apparatus of claim 15, wherein accessing said underlying logic comprises using existing functionality within said computerized content management system.

18. The apparatus of claim 15, wherein said plurality of targeting segments identify content of interest to individuals.

19. The apparatus of claim 18, wherein said applying of said security comprises allowing access to those of said users remaining after said users are respectively added and removed.

20. The apparatus of claim 18, wherein said applying of said security comprises denying access to those of said users not remaining after said users are respectively added and removed.

21. A non-transitory computer readable medium comprising computer executable instructions which when executed by a computer cause the computer to perform operations comprising:

instantiating a content targeting portion of a computerized content management system and a security portion of said computerized content management system;

interposing a bridge component between said content targeting portion and said security portion, said content targeting portion having a plurality of targeting segments defined therein;

creating, with said bridge component, a plurality of corresponding security groups for at least a subset of said plurality of targeting segments for which pre-existing security groups have not been created;

for said plurality of targeting segments, accessing, with said bridge component, underlying logic used by said content targeting portion to create said plurality of targeting segments, and using said underlying logic to determine whether each potential group member matches said underlying logic;

adding at least those of said potential group members that match said underlying logic, and are not already present, to an appropriate one of said corresponding security groups;

removing those of said potential group members that are currently members of said appropriate one of said corresponding security groups that do not match said underlying logic;

applying security to said corresponding security groups with said users respectively added and removed, with said security portion of said computerized content management system; and distributing content with said computerized content management system in accordance with said targeting segments and said corresponding security groups.

* * * * *